United States Patent [19]

Bescherer et al.

[11] Patent Number: 4,973,170

[45] Date of Patent: Nov. 27, 1990

[54] WINDOW THERMOMETER

[75] Inventors: Robert E. Bescherer, Bristol; Barry D. Colvin, Hope, both of R.I.

[73] Assignee: Aspects, Inc., Warren, R.I.

[21] Appl. No.: 487,157

[22] Filed: Mar. 1, 1990

[51] Int. Cl.$^5$ ............................................. G01K 01/14
[52] U.S. Cl. .................................... 374/208; 374/109; 374/194
[58] Field of Search ............... 374/208, 109, 206, 207, 374/194

[56] References Cited

U.S. PATENT DOCUMENTS

| | | | |
|---|---|---|---|
| 1,897,814 | 2/1933 | Nodine | 374/198 |
| 2,117,012 | 5/1938 | Whittier | 374/208 X |
| 2,276,179 | 3/1942 | Ford | 374/208 X |
| 2,964,947 | 12/1960 | DeJong | 374/206 |
| 3,122,018 | 2/1964 | Freeman et al. | 374/198 X |
| 3,518,884 | 7/1970 | Wood, Jr. | 374/194 X |

Primary Examiner—Daniel M. Yasich
Attorney, Agent, or Firm—Barlow & Barlow, Ltd.

[57] ABSTRACT

A window thermometer of the bimetallic type has a circular casing with a dial plate received in the casing for rotation relative thereto. The bimetallic element has one end coupled to the casing and the other end to a dial pointer. Suction cups with stems are secured to the dial plate by fasteners that pass through the casing and plate, the fasteners holding the parts together and yet permitting temperature calibration by permitting the plate to rotate relative to the casing when the fasteners are loosened.

1 Claim, 1 Drawing Sheet

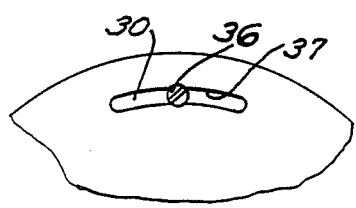
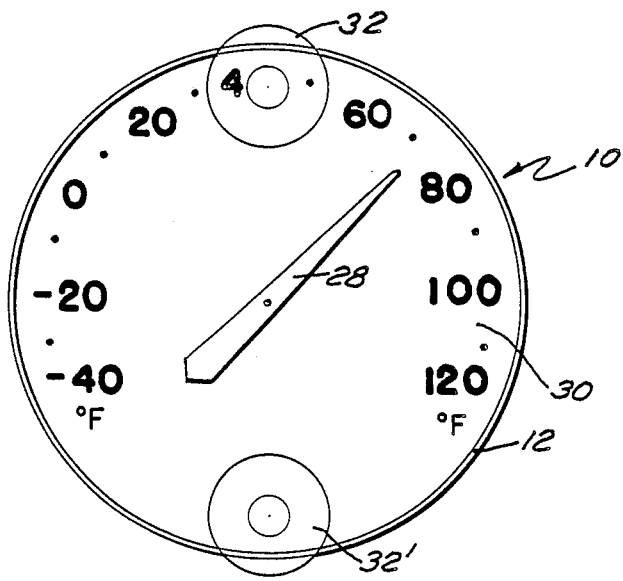
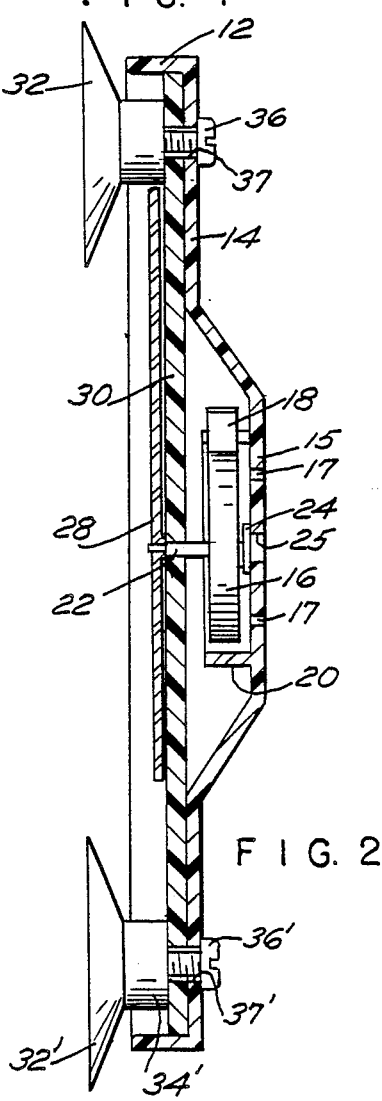
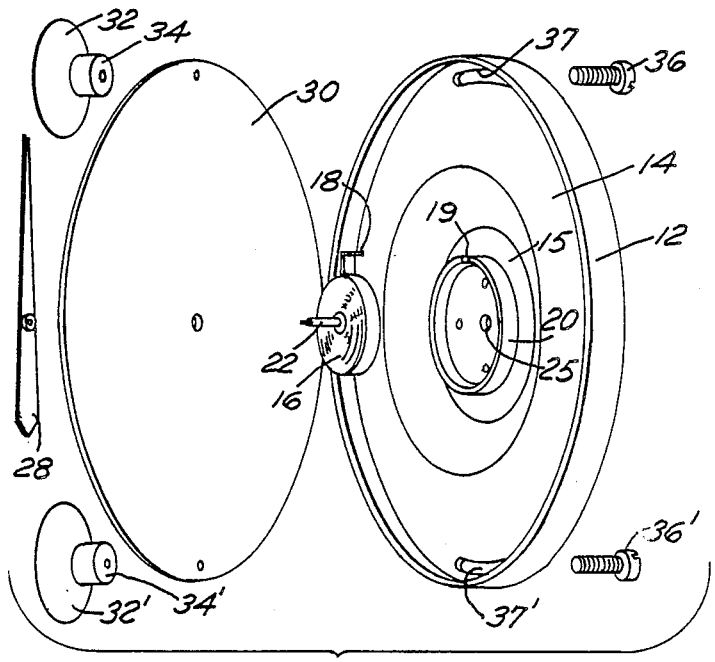

WINDOW THERMOMETER

BACKGROUND OF THE INVENTION

Thermometers which utilize bimetallic elements for indicating a surrounding temperature have been well known. Examples of such construction are seen, for example, in the U.S. Pat. Nos. 2,771,775 (374-208) and 1,897,814 (374-1). It is often desired to view the outside temperature through a window and to this end, it has been customary to provide thermometers that in some way could be mounted outdoors and be viewed through a window. Mounting thermometers by virtue of utilizing suction cups are generally known, as seen for example, in U.S. Pat. Nos. 2,117,012 and Des. 123,117 but items such as these, while they discloses the concept of attaching a thermometer on a window, the units are of a size and utility render them hard to read unless one is close to the window. Desirably, therefore, an ideal thermometer for mounting on a window pane for viewing the outside temperature should be of a sufficient size and of a stable mount so that it is fully usable.

SUMMARY OF THE INVENTION

The invention relates of a bimetallic thermometer for the measurement of outside temperature. The thermometer is designed to be mounted on the outside of a window by the utilization of a pair of spaced suction cups and applied to the window in such an attitude that it can be viewed through the window. The thermometer utilizes a casing which supports a dial and these two parts in turn mount a bimetallic strip and a pointer which is supported in bearing relationship on the casing and passes through the dial plate. Suction cups protrude from the face of the dial plate and fasteners pass from adjustment slots in the casing into and through the dial plate to be gripped by the suction cup. The arrangement is such that the fastener and suction cup serve as an adjustment for the calibration of the thermometer as well as a secure mounting means.

BRIEF DESCRIPTION OF THE DRAWINGS

FIG. 1 is a front elevational view of a thermometer made in accordance with the invention;

FIG. 2 is an enlarged sectional view thereof;

FIG. 3 is an exploded view of the invention; and

FIG. 4 is a partial rear view showing the temperature adjusting screws and slots.

DESCRIPTION OF THE PREFERRED EMBODIMENT

With reference to the drawings, there is shown a circular casing 10 which is formed as a shallow cup with cylindrical side walls 12 and a bottom wall 14 which has a portion at 15 into which a bimetallic strip 16 is received. The portion 15 also has a plurality of apertures 17 formed therein so as to transmit air to the bimetallic element 16.

The temperature responsive member 16 consists of a spirally formed bimetallic strip whose outer coil is provided with an outwardly extending tongue 18 that passes through a slot 19 in a raised lip 20 that rises from the portion 15. The tongue 18 is therefore received in the slot 19 in the wall 20. In the center of the spiral coil 16, there is a pin 22 which is fixed to and carried by the inner end of the coil. The pin specifically has an enlargement 24 to provide a bearing against the wall 15 and a terminal portion thereof is loosely received in an aperture 25 in the wall.

The pin 22 extends upwardly through a central aperture in the dial plate 30 and at the end of the pin, there is affixed a pointer 28. On the plate 30 there is suitably reproduced a temperature scale covering a suitable range and the pointer 28 cooperates with this scale to visibly indicate the temperature as sensed by the bimetallic coil 16.

Means are provided to retain the thermometer to a surface such as a window and such means include a pair of suction cups 32, 32', each of which has a stem 34, 34' that engages the face of the dial plate 30 and is in the form of a post-like structure. As well understood, the suction cup is preferably made of a yieldable material with a concave front face. Each of the suction cups is secured by means of a fastener 36, 36' which pass through arcuate slots 37, 37' that are formed in the bottom wall 14. The arrangement is such that the dial plate may be rotated relative to the casing and essentially calibrate the thermometer. To this end, therefore, the fasteners 36, 36' would be loosened and the dial plate 30 rotated in relation to the casing to obtain the desired result and then the fasteners 36, 36' would be tightened. It will be apparent by referring to FIG. 2, that the dial plate is received in frictional engagement with the inside of the back wall 14 so that tightening the screws 36, 36' will draw the stem of the suction cups to the dial plate causing the parts to be clamped tightly together. The suction cups and the fasteners, therefore, serve not only as a means of calibrating the thermometer but also as a means of mounting the thermometer on a window so that it can be readily viewed from the inside of a dwelling, or the like.

We claim:

1. A window thermometer comprising a circular casing, said casing having arcuate slots therein spaced adjacent diametrically opposite edges, a dial plate with indicia thereon disposed in the casing, a bimetallic temperature sensor having one end coupled to the casing, an indicator needle having a mounting shaft positioned to pass through the dial plate and having bearing engagement with the casing, said shaft connected to the other end of the sensor, suction cups having stems protruding therefrom engaging the dial plate, fasteners passing through the slots in the casing, through the dial plate and thence into the stems of the suction cups to secure the casing, dial plate and suction cup parts together and upon loosening, permit the dial plate to be rotated relative to the sensor to adjustably calibrate the thermometer.

* * * * *